(12) United States Patent
Lebuffe et al.

(10) Patent No.: US 8,042,455 B2
(45) Date of Patent: Oct. 25, 2011

(54) AUTOMATIC COFFEEMAKER PROVIDED WITH AN AUTOMATIC GROUNDS DISPENSER

(75) Inventors: Gilles Lebuffe, Conde sur Vire (FR); Patrick Leveque, Vire (FR)

(73) Assignee: SED S.A., Ecully (FR)

( * ) Notice: Subject to any disclaimer, the term of this patent is extended or adjusted under 35 U.S.C. 154(b) by 533 days.

(21) Appl. No.: 12/332,786

(22) Filed: Dec. 11, 2008

(65) Prior Publication Data
US 2009/0145303 A1    Jun. 11, 2009

(30) Foreign Application Priority Data

Dec. 11, 2007   (FR) ..................... 07 08607

(51) Int. Cl.
*A47J 31/40*    (2006.01)
*G01F 11/00*    (2006.01)
(52) U.S. Cl. ........ 99/289 R; 222/63; 222/235; 222/311; 222/410
(58) Field of Classification Search ............ 99/280, 99/289 R, 290; 222/63, 235, 236, 311, 333, 222/410
See application file for complete search history.

(56) References Cited

U.S. PATENT DOCUMENTS

| | | | | | |
|---|---|---|---|---|---|
| 1,894,815 | A | * | 1/1933 | Biggert, Jr. et al. | 318/258 |
| 2,441,291 | A | * | 5/1948 | Rivoira | 318/274 |
| 3,010,382 | A | * | 11/1961 | Andres | 99/289 R |
| 3,415,419 | A | * | 12/1968 | Jewett et al. | 222/333 |
| 4,148,415 | A | * | 4/1979 | Florida et al. | 222/37 |
| 4,651,632 | A | * | 3/1987 | Motsch | 99/289 R |
| 5,139,484 | A | * | 8/1992 | Hazon et al. | 604/154 |
| 5,303,639 | A | * | 4/1994 | Bunn et al. | 99/289 R |
| 5,791,526 | A | * | 8/1998 | Landais et al. | 222/333 |
| 7,328,649 | B2 | * | 2/2008 | Morin et al. | 99/289 R |

FOREIGN PATENT DOCUMENTS

FR    2713906 A    6/1995
JP    01087982 A *  4/1989

* cited by examiner

*Primary Examiner* — Stephen F Gerrity
(74) *Attorney, Agent, or Firm* — Browdy and Neimark, PLLC

(57) ABSTRACT

An automatic dispenser of ground coffee having: a reservoir having a flow outlet opening and adapted to contain a quantity of ground coffee; at least one paddle mounted to rotate in the bottom of the reservoir to transfer a predetermined quantity of ground coffee from the reservoir through the flow outlet opening; and a motor assembly connected for driving the paddle in rotation. The motor assembly is composed of: a motor having two input terminals via which operating current is supplied to the motor; and a control circuit having at least one component connected to establish a short circuit between the two terminals after the supply of operating current to the motor has been cut off.

10 Claims, 4 Drawing Sheets

AUTOMATIC COFFEEMAKER PROVIDED WITH AN AUTOMATIC GROUNDS DISPENSER

BACKGROUND OF THE INVENTION

The present invention relates to an automatic grounds dispenser intended to be installed particularly in an automatic coffeemaker.

An exemplary known automatic dispenser is described in French patent 2713906. This dispenser includes a reservoir arranged to contain a quantity of ground coffee, and at least one rotatable paddle placed in the bottom of the reservoir and driven in rotation by a motor group. The paddle is adapted to rotate in order to transfer predetermined quantity of coffee grounds through a flow outlet opening provided in the reservoir. The grounds that flow through the opening are conveyed toward an outlet provided in a housing and communicating with the outlet opening of the reservoir.

The quantity of grounds transferred is determined by the angular sector traversed by the paddle. This sector is traversed between start-up and stopping of the motor group. It might be noted that at the moment of occurrence of the signal for stopping the motor, the inertia of the motor causes the position at which the paddle stops to have a significant angular variation as a function of the level of coffee grounds in the reservoir, the granulometry of the grounds, and/or the degree of compaction of the mass of ground coffee. This variation induces a substantial variability in the quantity of grounds dispensed from one brewing cycle to another.

BRIEF SUMMARY OF THE INVENTION

The present invention provides an automatic grounds dispenser furnished with a device providing an accurate dose of ground coffee in a repeatable manner.

The invention further provides a dispenser having these characteristics and which is yet simple and economical to fabricate.

The invention further provides such a dispenser that is highly reliable and durable.

More specifically, the invention provides an automatic dispenser of ground coffee having a reservoir adapted to contain a quantity of ground coffee and at least one paddle mounted to rotate in the bottom of the reservoir, the paddle being driven in rotation by motor means supplied with power via two terminals and controlled by a control circuit. The paddle, while turning, transfers a predetermined quantity of ground coffee through a flow outlet opening provided in the reservoir. According to the invention, the control circuit establishes a short circuit between the two terminals of the motor means after the supply of operating power to the motor has been cut off.

According to the invention, the cut-off of power to the motor and the establishment of a short circuit between the two terminals of the motor means when the dispensing of ground coffee is to be halted results in a halting of the rotatable paddle in an accurately determined position.

Applicant has demonstrated that the angular position of the halting of the paddle is less than four degrees, which is five times less than the precision that can be obtained when the halting of the paddle is achieved solely by cutting off the supply of power to the terminals of the motor means.

In addition, the construction of such a device only requires the addition of a few electronic components to the control circuit, so that the resulting device is very simple and economical to fabricate.

Advantageously, the control circuit has a microcontroller having a single output providing a signal that controls at the same time the cutting off of the supply of power to the motor and the creation of the short circuit between the two terminals of the motor means.

This arrangement permits the achievement of a reliable operation of the device. In effect, even if the microcontroller should fail, the output cannot produce a short circuit between the terminals of the motor means without cutting off the power supplied to the motor means.

Preferably, the motor means has means for detecting the position of the rotatable paddle for halting dispensing of the ground coffee.

Advantageously, the means for detecting the position of the rotatable paddle are constituted by a notched, or toothed, or cam, wheel and a microswitch.

Preferably, the motor means includes a direct current motor.

These two features result in position detection means that are very economical, based on conventional components that are readily available on the market.

The invention is also directed to an automatic coffeemaker having an automatic grounds dispenser according to the present invention.

Advantageously, the reservoir is removably installed in a housing provided in the automatic coffeemaker and the housing includes a dispensing outlet situated in line with the flow outlet opening of the reservoir and a protection tongue located above this outlet in order to prevent access by the user's fingers when the reservoir has been withdrawn from the housing. This arrangement improves the safety of the coffeemaker by a simple and economical solution to prevent the user from inserting his fingers in the outlet in the housing. Because the rotatable paddle is caused to stop in a precisely defined position, this assures that the paddle will not be under the tongue in order to permit withdrawal of the reservoir from the housing.

BRIEF DESCRIPTION OF THE DRAWING

The following drawings show a non-limiting example of a preferred embodiment of the invention.

DETAILED DESCRIPTION OF THE INVENTION

FIGS. 1 to 5 illustrate one preferred embodiment of an automatic coffeemaker 1 having an automatic grounds dispenser according to the invention.

Figure 1:
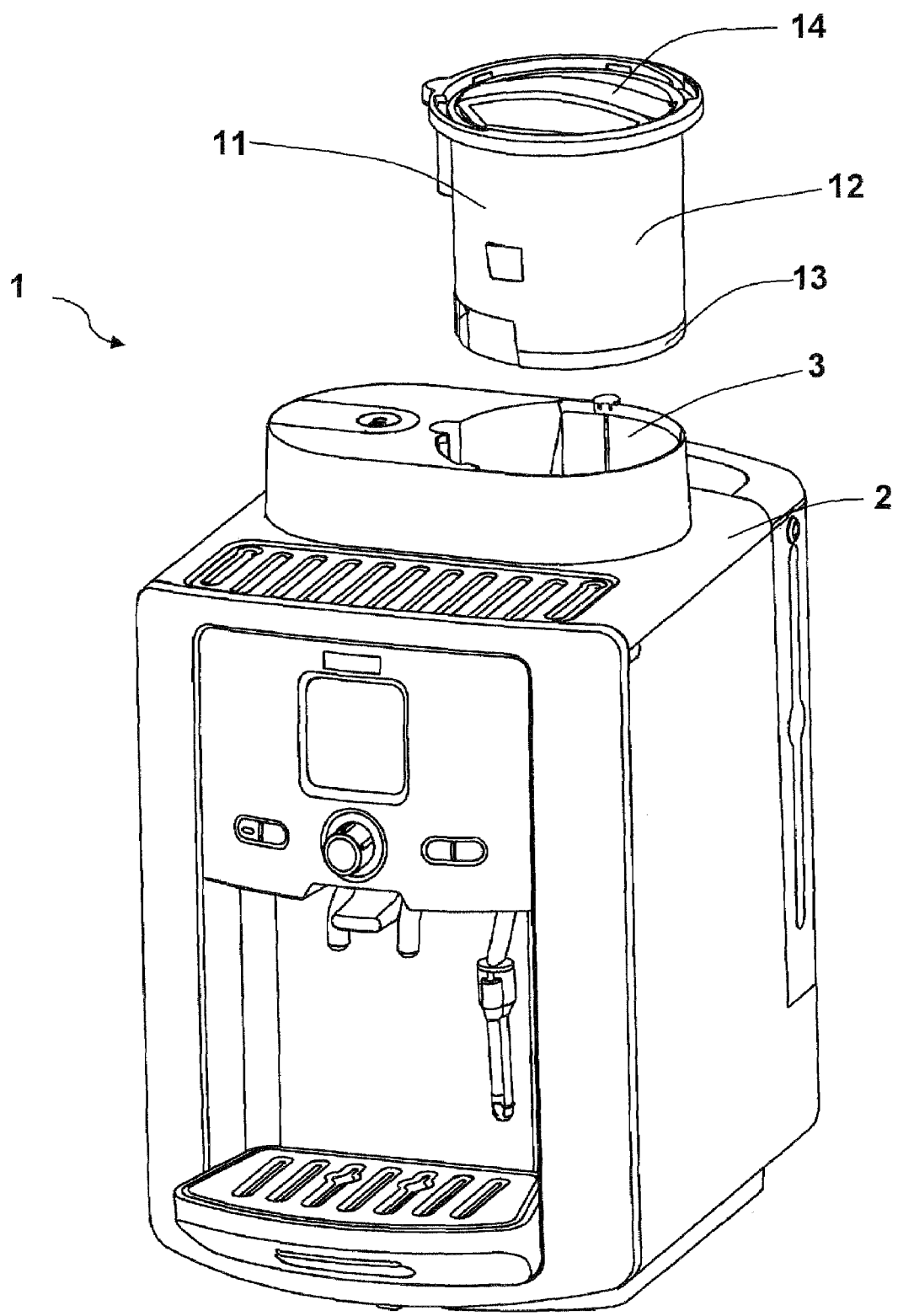
FIG. 1 is a perspective view of an automatic coffeemaker having an automatic grounds dispenser according to a particular embodiment of the invention.

As is shown in FIG. 1, automatic coffeemaker 1 has a case 2 providing a housing 3 for receiving a removable reservoir 11 adapted to contain a quantity of ground coffee.

Figure 2:
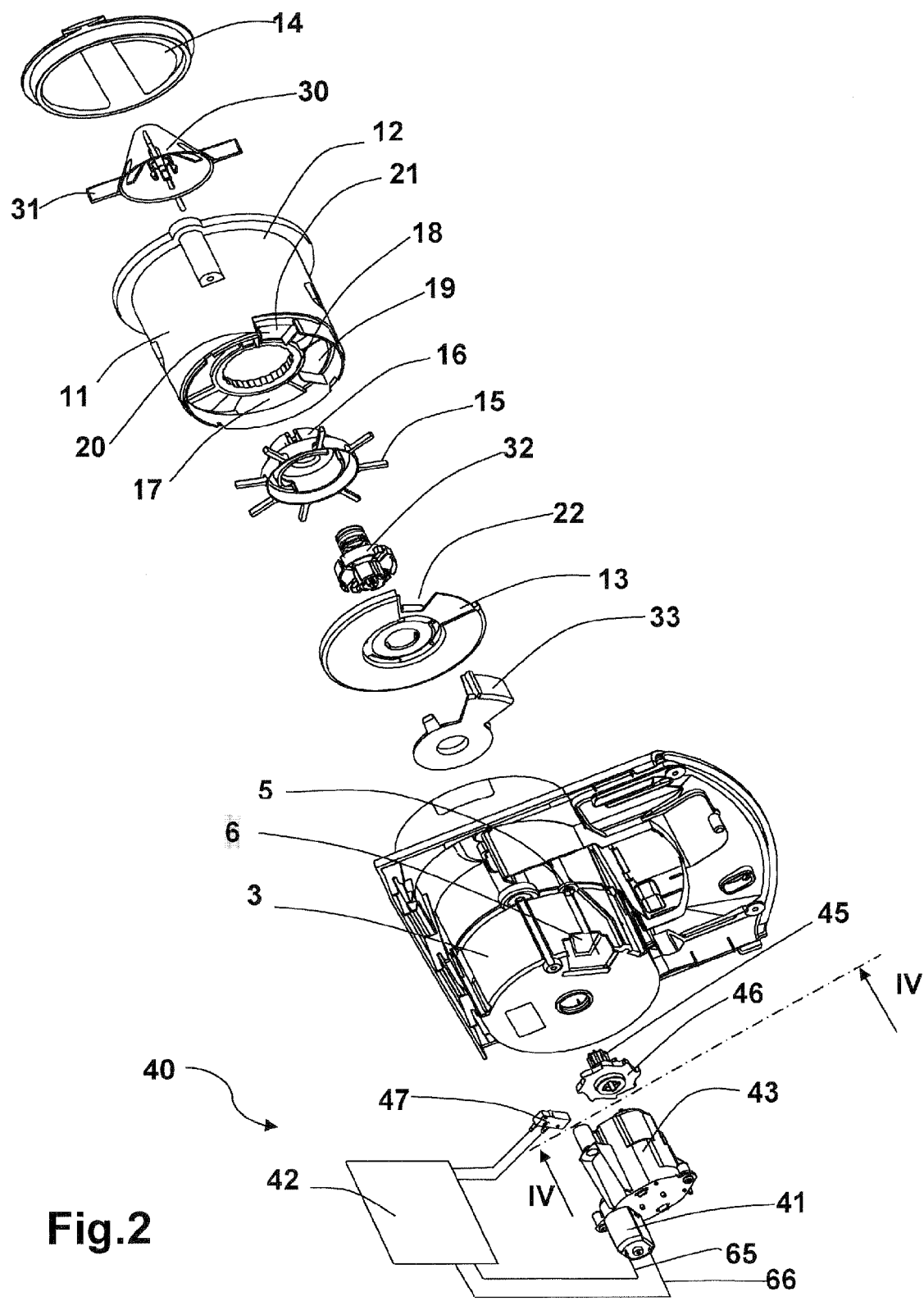
FIG. 2 is an exploded perspective view of the automatic coffee grounds dispenser of the automatic coffeemaker of FIG. 1.

As is shown in FIGS. 1 and 2, reservoir 11 has a generally circular cylindrical form and is composed of a side wall 12, a bottom 13 and a lid 14. Reservoir 11 includes at its bottom several rotatable radial paddles, or blades, 15. In the specific example illustrated, there are eight such paddles. Paddles 15 are distributed uniformly around a cylindrical hub 16 and extend substantially to the periphery of reservoir 11, defined by the inner surface of wall 12.

Cylindrical hub 16 is rotatably mounted in an annular cradle, or bearing, 18 carried by an intermediate support part 17 extending parallel to bottom 13 and fixed to sidewall 12.

Reservoir 11 has, above intermediate support part 17, a cone 30 provided with four laterally extending blades 31 fixed to the upper part of hub 16. Blades 31 and cone 30 rotate to transfer grounds toward rotatable radial paddles 15 through opening 19 provided in intermediate support part 17.

Paddles 15 are intended to be driven through the intermediary of hub 16, with the aid of a rotatable coupling mechanism 32, by motor means 40 fixed in housing 2 in order to transfer a predetermined dose of ground coffee through a flow outlet opening 20 in side wall 12 and bottom 13, toward an outlet 5 formed in housing 3 and communicating directly with flow outlet opening 20.

Flow outlet opening 20 is constituted by a cut-out 21 arranged in sidewall 20 of reservoir 11 between intermediate support part 17 and bottom 13, and by a cut-out 22 provided in bottom 13 of reservoir 11, cut-out 22 having essentially the form of an annular circular segment.

Reservoir 11 has a rotatably retractable shutter 33 moveable to block flow outlet opening 20 whenever reservoir 11 is withdrawn from automatic coffeemaker 1.

Figure 3:
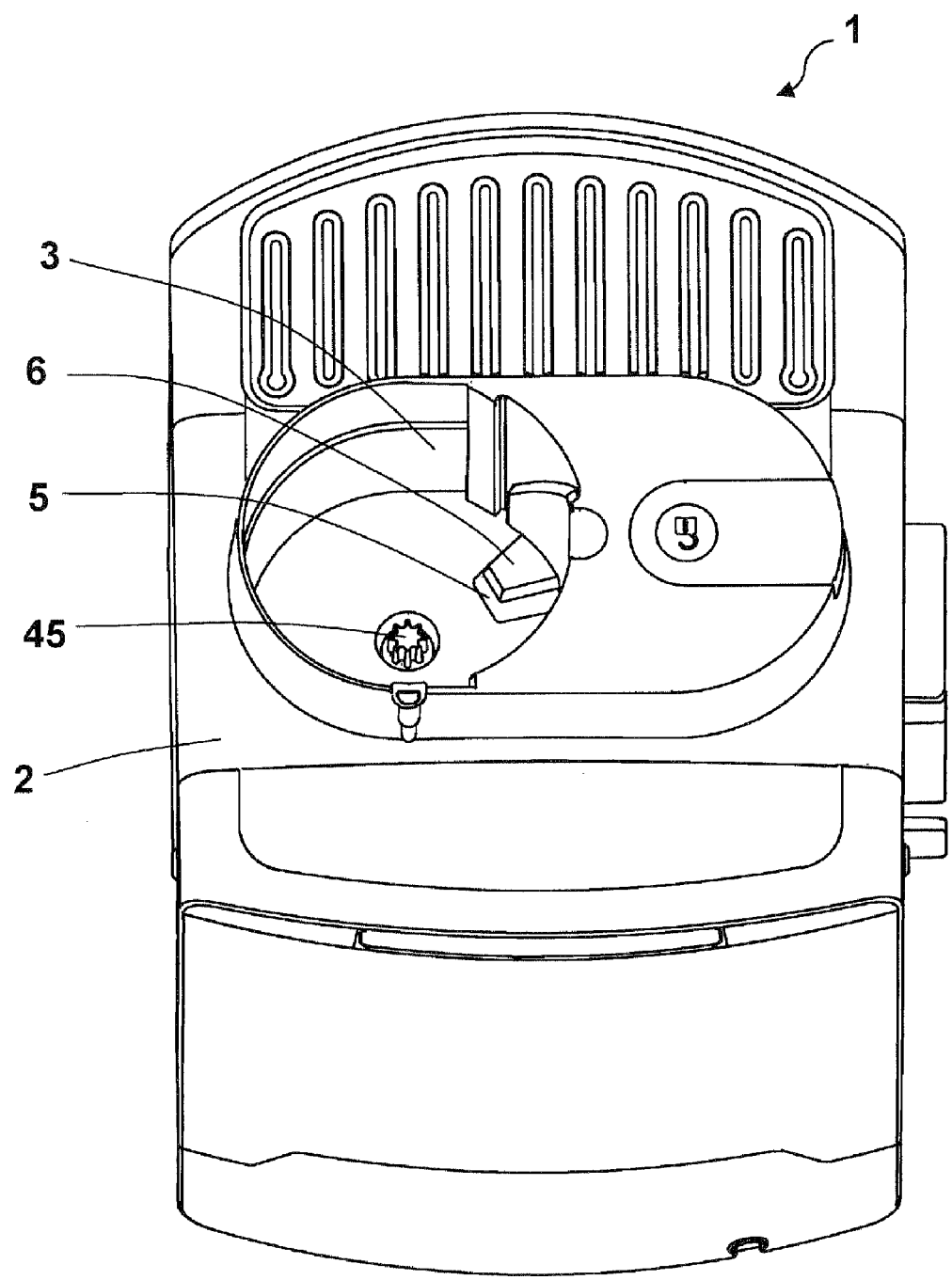
FIG. 3 perspective view from the top illustrating the housing in a case of the automatic coffeemaker of FIG. 1, the housing being provided with a tongue.

Outlet 5, which is visible in FIGS. 2 and 3, is located along the side, and in the bottom, of housing 3 and has essentially the same form as flow outlet opening 20. A protection tongue 6 (FIG. 3) fixed to the wall of housing 3, extends radially and is situated above removal outlet 5. Tongue 6, by taking on the same form as cut-out 22 in bottom 13 of reservoir 11, is adapted to come to be housed under intermediate support part 17 when reservoir 11 is placed into coffeemaker 1 and allow rotation of paddles 15.

When the reservoir is withdrawn from the coffeemaker, tongue 6 prevents the user from inserting a finger into outlet 5 towards the interior of the coffeemaker, which can be dangerous in the case of an inopportune starting of the machine.

After dispensing a predetermined dose of ground coffee, motor means 40 are halted in a manner to assure that paddles 15 will come to a halt such that two adjacent ones of the paddles come into position at opposite edges of, or straddle, opening 20, or in other words, come to border that opening, in a manner to prevent any further outflow of ground coffee.

Figure 4:
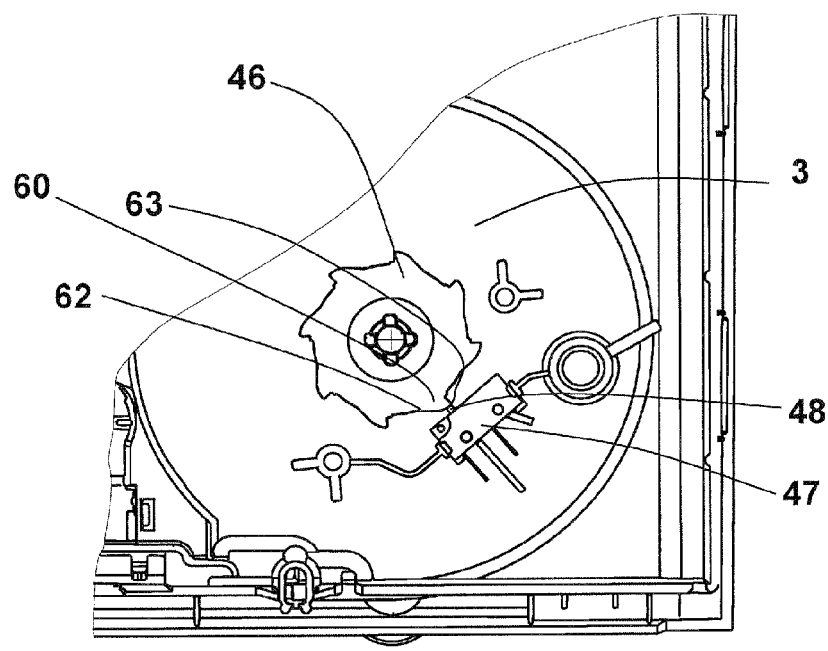
FIG. 4 is a partial cut-away view from below illustrating a toothed, or notched, wheel and a microswitch of an automatic coffee grounds dispenser of the automatic coffeemaker of FIG. 1.

Motor means 40 (FIG. 2) is composed of a motor 41 having terminals 65, 66 via which the motor is supplied with direct current, a circuit 42 for controlling operation of the motor, a speed reducer 43 driving a coupling element constituted by a stud 45 forming a unit with, and extending from the upper face of, a toothed wheel, or cam wheel, 46, and a microswitch 47 provided with an actuator 48 (FIG. 4). Toothed wheel 46 includes a plurality of camming elements, or teeth, 60 equal to the number of rotatable paddles 15. Each camming element 60 includes a leading edge in the form of a ramp 62 adapted to depress actuator 48 of microswitch 47 during rotation of motor 41, and a trailing edge 63 forming a recess and adapted to release actuating element 48 of microswitch 47. Each trailing edge 63 is positioned in a manner such that actuator 48 will be released at a moment when two rotatable paddles 15 border flow outlet opening 20, corresponding to a stopping position of the motor and the paddles, every one-eighth of a rotation. Release of actuating element 48 provokes a change in the switching state of microswitch 47, which is then detected by control circuit 42 via an input 52, shown in FIG. 5.

Figure 5:
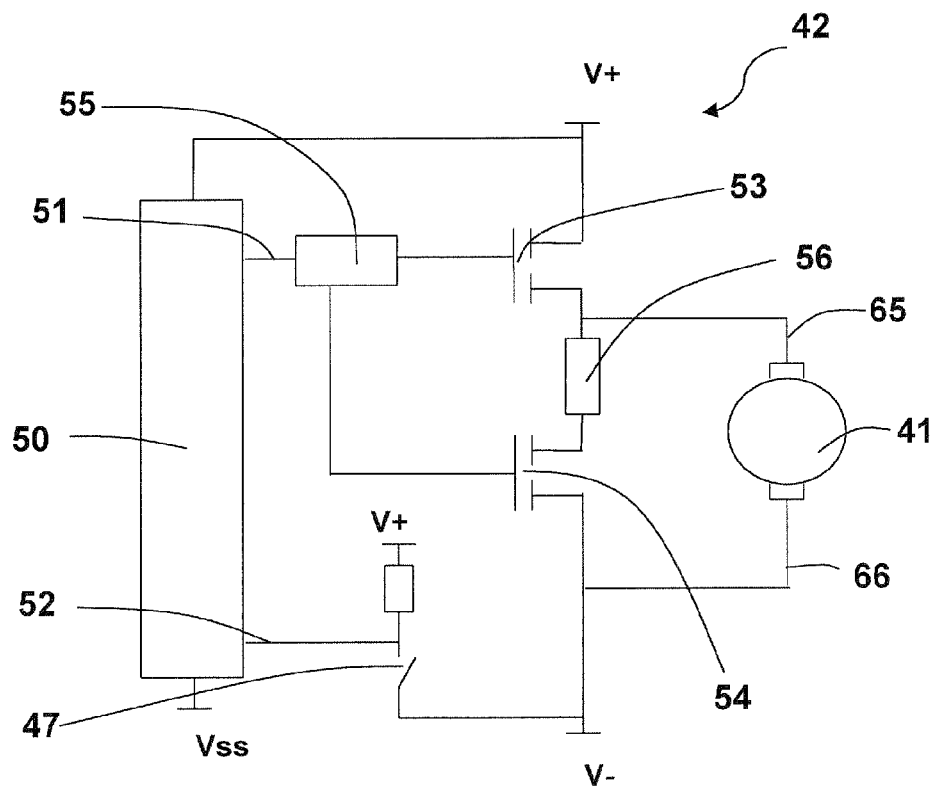
FIG. 5 is a circuit diagram of a control circuit for the drive motor of an automatic coffee grounds dispenser according to the invention.

FIG. 5 shows a preferred example of control circuit 42, which includes a microcontroller 50 provided with an output 51 that controls a transistor 53 such that when the signal on output 51 is in a high state, transistor 53 is switched to its conductive state to place motor 41 in operation. The signal at the same output 51 controls a second transistor 54 such that when the signal on outlet 51 is in its low state, transistor 54 is switched to its conductive state to brake the motor by establishing a short circuit between motor input terminals 65 and 66. Control circuit 42 also has a management circuit 55 for controlling transistors 53 and 54 in such a manner as to not switch them into their "on", or conductive, state at the same time, even in the event of failure of microcontroller 50.

Control circuit 42 also has a protection component formed by a resistor 56 that is effective to limit the short-circuit current generated upon halting of motor 41 in order to protect transistor 54 during switching of the two transistors 53 and 54. Resistor 56 also provides the function of a fuse if transistors 53, 54 should experience an operating failure.

Control circuit 42 also has a memory (not shown) in which a coffee type, i, is associated with a number, Ni, of eighths of a rotation of the shaft carrying paddles 15. The number, Ni, corresponds to a selected quantity of a certain type of coffee grounds, Mi.

In operation, the user pours ground coffee into reservoir 11 and positions the reservoir in housing 3 of case 2 of the automatic coffeemaker. The user then initiates the preparation of a serving of a particular type of coffee, i, thereby initiating a grounds dispensing cycle. Control circuit 42 places motor 41 into operation in order to rotate paddles 15 so as to transfer a dose of grounds toward outlet 5 located in housing 3. When control circuit 42 has detected a number of changes in the operating state of microswitch 47 equal to i, generated by rotation of wheel 46, the signal on output 51 assumes a state to terminate the supply of power to motor 41, so as to cause it to stop. Immediately after the supply of operating power to motor 41 is halted, transistor 54 is placed in a conductive state in order to produce a short circuit between terminals 65 and 66, thereby provoking a precise halting of the rotation of paddles 15.

Of course, the invention is not in any way limited to the specific embodiment described and illustrated, which has been given only by way of example. Various modifications remain possible, particularly from the point of view of the structure of the various elements or by substitution of technical equivalents, without departing from the framework of the present invention.

Thus, the control circuit can interrupt the supply of power to the motor and the creation of a short circuit between the motor terminals with the aid of relays.

According to an alternative embodiment, the means for detecting the position of the rotatable paddles can be constituted by a perforated disk and an optical sensor.

According to another alternative, the means for detecting the position of the rotatable paddles can be constituted by a wheel carrying magnets and a hall effect sensor.

This application relates to subject matter disclosed in French Application numbers FR 07 08607, filed on Dec. 11, 2007, the disclosures of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic dispenser of ground coffee comprising:
  a reservoir having a flow outlet opening and adapted to contain a quantity of ground coffee;
  at least one paddle mounted to rotate in the bottom of said reservoir to transfer a predetermined quantity of ground coffee from said reservoir through said flow outlet opening; and
  motor means connected for driving said paddle in rotation, said motor means comprising:
    a motor having two input terminals via which operating current is supplied to said motor; and
    a control circuit having at least one component connected to establish a short circuit between said two terminals after the supply of operating current to said motor has been cut off.

2. The automatic dispenser of claim 1, wherein said control circuit comprises a microcontroller having a single output providing a signal that controls at the same time the cutting off of the supply of operating current to said motor and the creation of the short circuit between said two terminals.

3. The automatic dispenser of claim 2, wherein said motor means further comprises means for detecting the angular position of said paddle at which the dispensing of the ground coffee is to be halted.

4. The automatic dispenser of claim 3, wherein said means for detecting the angular position of said paddle comprise a toothed cam wheel and a microswitch.

5. The automatic dispenser of claim 4, wherein said motor is a direct current motor.

6. The automatic dispenser of claim 1, wherein said motor means further comprises means for detecting the angular position of said paddle at which the dispensing of the ground coffee is to be halted.

7. The automatic dispenser of claim 6, wherein said means for detecting the angular position of said paddle comprise a toothed cam wheel and a microswitch.

8. The automatic dispenser of claim 7, wherein said motor is a direct current motor.

9. An automatic coffeemaker comprising: apparatus for brewing coffee; and said automatic grounds dispenser according to claim 1.

10. The automatic coffee maker of claim 9, wherein:
  said coffee maker comprises a case provided with a housing for receiving said reservoir;
  said reservoir is removably installed in said housing; and
  said housing has a dispensing outlet situated in line with a grounds outlet opening of said reservoir, and a protection tongue located above said dispensing outlet in order to prevent access by the user's fingers when said reservoir has been withdrawn from said housing.

* * * * *

UNITED STATES PATENT AND TRADEMARK OFFICE
CERTIFICATE OF CORRECTION

PATENT NO. : 8,042,455 B2
APPLICATION NO. : 12/332786
DATED : October 25, 2011
INVENTOR(S) : Lebuffe et al.

Page 1 of 1

It is certified that error appears in the above-identified patent and that said Letters Patent is hereby corrected as shown below:

Title page, item (73) Assignee: delete "SED S.A., Ecully (FR)" and insert --SEB S.A., Ecully (FR)--.

Signed and Sealed this
Tenth Day of April, 2012

David J. Kappos
*Director of the United States Patent and Trademark Office*